United States Patent [19]

Ataka et al.

[11] Patent Number: 5,891,514
[45] Date of Patent: Apr. 6, 1999

[54] METHOD FOR MANUFACTURING MAGNETIC RECORDING MEDIUM

[75] Inventors: Toyoji Ataka; Keiji Ohkubo, both of Nagano, Japan

[73] Assignee: Fuji Electric Co., Ltd., Japan

[21] Appl. No.: 971,471

[22] Filed: Nov. 17, 1997

Related U.S. Application Data

[63] Continuation of Ser. No. 753,315, Nov. 22, 1996, abandoned.

[30] Foreign Application Priority Data

Nov. 24, 1995 [JP] Japan .................................. 7-305534

[51] Int. Cl.$^6$ ...................................................... B05D 5/12
[52] U.S. Cl. .......................... 427/132; 427/131; 427/250; 427/255.2; 427/255.7
[58] Field of Search ..................................... 427/131, 132, 427/250, 255.2, 255.7

[56] References Cited

U.S. PATENT DOCUMENTS 5,232,566   8/1993   Edmonson et al. .................. 427/131 X

OTHER PUBLICATIONS

"Effects of $O_2$ Addition On Magnetic Layer of CoCrTa/Cr, CoCrPtB/Cr Media", Digests of the 19th Annual Conference on Magnetics in Japan, 1995 (No month avail.).

*Primary Examiner*—Bernard Pianalto
*Attorney, Agent, or Firm*—Rossi & Associates

[57] ABSTRACT

In a method for manufacturing a magnetic recording medium, a non-metallic metal base layer, a ferromagnetic alloy thin-film magnetic layer and a protective layer are successively laminated on a non-magnetic substrate. The ferromagnetic alloy thin-film magnetic layer consists of a first magnetic layer and a second magnetic layer. In the method of the present invention, the first magnetic layer is formed in an atmosphere containing an Ar gas, and the second magnetic layer is formed in an atmosphere containing a mixture of Ar and $N_2$ gases.

1 Claim, 1 Drawing Sheet

METHOD FOR MANUFACTURING MAGNETIC RECORDING MEDIUM

This is a continuation of application Ser. No. 08/753,315 filed Nov.22, 1996, now abandoned.

FIELD OF THE INVENTION

The present invention relates to a magnetic recording medium, such as a fixed magnetic disc, used in a memory utilizing magnetic recording.

BACKGROUND OF THE INVENTION

In recent years, fixed magnetic disc drives have been widely used as external memories for information processing devices, such as computers. FIG. 2 is a schematic cross sectional view showing the film structure of a typical magnetic recording medium known in the art. In the magnetic recording medium shown in FIG. 2, a non-magnetic layer 2 made of Ni—P or Al, for example, is formed on a substrate 1 made of Al or glass, for example, to provide a base 11, and a non-magnetic metal base layer 3, a hard magnetic layer 4, and a protective layer 5 containing carbon as a major component are successively formed in lamination on the base 11. Further, a lubrication layer 6 prepared from a liquid lubricant is formed on the protective layer 5. The above-indicated hard magnetic layer 4 consists of a single layer made of CoCrTa or CoCrPtTa, for example, and having a coercive force (Hc) of $0.13 \times 10^6$ A/m or higher.

To produce the magnetic recording medium as described above, the non-magnetic substrate 1 made of an aluminum alloy or a glass material or the like is finished with desired parallelism, flatness and surface roughness, and the non-magnetic layer 2 consisting of Ni—P or Al film is formed on a major surface of the non-magnetic substrate 1 in a wet film-forming process, such as electroless plating, or a dry process, such as sputtering or deposition, to thus provide the non-magnetic base 11. Thereafter, the base 11 may be finished again by machining or reverse sputtering to achieve desired flatness and surface roughness. This base 11 is then heated to 150° to 300° C., and the non-magnetic metal base layer 3, hard magnetic layer 4 and protective layer 5 are successively formed on the surface of the base 11 while a dc bias of about 350V is applied to the base 11. The non-magnetic metal base layer 3 is made of Cr and has a film thickness of about 50 nm, and the hard magnetic layer 4 is made of a material, such as CoCrTa, which contains Co as a major component, and has a film thickness of about 30 nm, while the protective layer 5 contains carbon as a major component, and has a film thickness of about 10 nm. The protective layer 5 is then coated with a liquid lubricant containing fluorocarbon, which forms the lubrication layer 6 having a thickness of about 1 nm. In this manner, the magnetic recording medium 7 is produced.

In practical use, the magnetic recording medium thus produced exhibits excellent mechanical characteristics, such as high strength and high dimensional accuracy, and also exhibits excellent magnetic characteristics that the coercive force Hc is about $0.24 \times 10^6$ A/m, and the product (Br.t) of the residual magnetic flux density and the film thickness is about $2.5 \times 10^{-2}$ T$\mu$m. The recording medium, however, has a relatively low coercive force angle ratio (S*) of about 0.75, that is the gradient of the magnetic curve near the coercive force Hc. As a technique for increasing the coercive force angle ratio (S*) while keeping the coercive force (Hc) constant in order to improve the above point, there is disclosed (in Digests of the 19th Annual conference on Magnetics in Japan 1995, 26aA-1)a method in which a Co alloy hard magnetic layer 40 as shown in FIG. 1 is separated into two layers, i.e., a first hard magnetic layer 4a formed in an Ar atmosphere, and a second hard magnetic layer 42 formed in an atmosphere that is a mixture of Ar and $O_2$ gases.

With a rapidly increasing amount and variety of information in recent years, the fixed magnetic disc device is strongly desired to have a higher recording density and a larger capacity in view of the necessity for processing such a large amount of information. To this end, the magnetic recording medium is desired to have a high linear recording density, reduced noise (N), and good electromagnetic converting characteristics.

Further, there is a need to increase the percentage of non-defective (yield) so as to allow mass production of the magnetic recording medium at a reduced cost per product.

SUMMARY OF THE INVENTION

It is therefore an object of the present invention to improve the linear recording density and electromagnetic converting characteristics, such as PW50, of a magnetic recording medium, by increasing the coercive force (Hc) and coercive force angle ratio (S*).

The above object may be accomplished according to the principle of the present invention, which provides a method for manufacturing a magnetic recording medium, comprising the step of: successively laminating a non-magnetic metal base layer, a ferromagnetic alloy thin-film magnetic layer and a protective layer on a non-magnetic substrate, the ferromagnetic alloy thin-film magnetic layer comprising a first magnetic layer and a second magnetic layer, wherein the first magnetic layer is formed in a first atmosphere comprising an Ar gas, and the second magnetic layer is formed in a second atmosphere that comprises a mixture of Ar and $N_2$ gases. In particular, the second magnetic layer is preferably formed in an atmosphere in which Ar is mixed with 1to 2% of $N_2$ with respect to a total of the Ar and $N_2$ gases.

BRIEF DESCRIPTION OF THE DRAWINGS

The invention will be described in greater detail with reference to a certain preferred embodiment thereof and the accompanying drawings, wherein.

DETAILED DESCRIPTION OF THE PREFERRED EMBODIMENT

Figure 1:
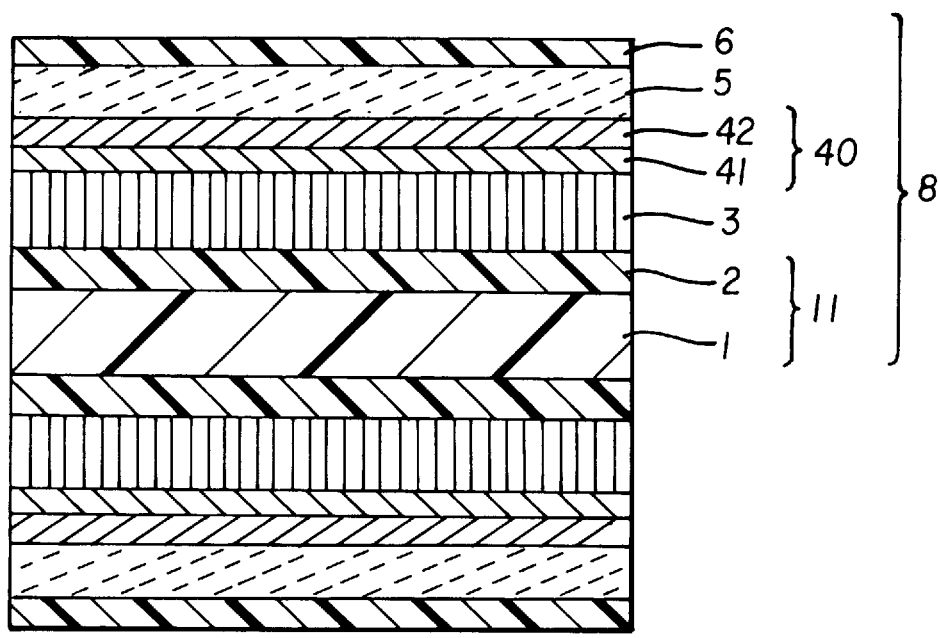
FIG. 1 is a cross sectional view showing a magnetic recording medium according to one embodiment of the present invention.
Figure 2:
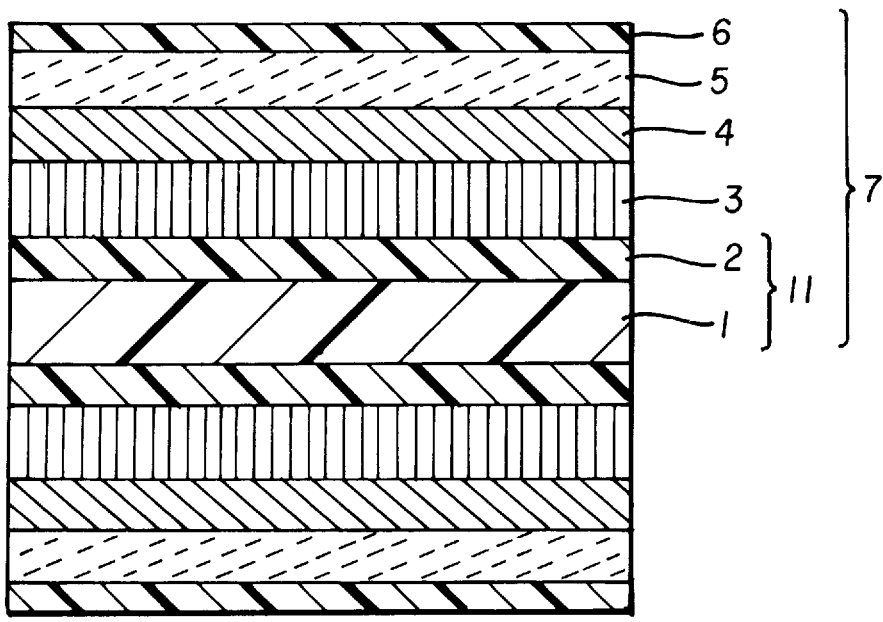
FIG. 2 is a cross sectional view showing a typical magnetic recording medium known in the art.

As shown in FIG. 1, a non-magnetic layer 2 in the form of an about 10 $\mu$m-thickness NiP film was initially formed by plating on a non-magnetic substrate 1 made of Al or glass and having predetermined degrees of parallelism, flatness and surface roughness, to provide a non-magnetic base 11. A carrier on which the base 11 was mounted was fed through a furnace in which three kinds of targets, i.e., Cr, Co alloy and carbon, for forming films were arranged in this order, so that thin films as described below were formed on the base 11. In the present embodiment, the base 11 was stopped at respective positions of these targets.

More specifically, four thin films were formed on the base 11 in the following manner. Initially, an Ar gas was introduced into a vacuum chamber in which about 50 nm-thickness non-magnetic metal base layer 3 made of Cr and about 10 nm-thickness first hard magnetic layer 40 ($Co_{0.72} Cr_{0.13} Pt_{0.1} B_{0.05}$) were formed, and mixed gases of Ar and X?$N_2$ were introduced so that about 15 nm-thickness second hard magnetic layer 42 ($Co_{0.72} Cr_{0.13} Pt_{0.1} B_{0.05}$) was formed. Then, mixed gases of Ar and $CH_3$ were introduced so that about 10 nm-thickness protective layer 5 in the form of DLC (Diamond Like Carbon) film was formed. The formation of these films 3, 4, 5 was conducted according to film-forming conditions as indicated in TABLE 1 below.

TABLE 1

| Film-Forming Conditions | | | |
| --- | --- | --- | --- |
| Ultimate vacuum | $1.0 \times 10^{-4}$ Pa or lower | Cr rate | 2 nm/s |
| Heating of substrate before film formation | about 200° C. | Co alloy rate | about 2 nm/s |
| Material gas | Ar | C rate | about 0.1 nm/s |
| Film forming gas pressure | 0.66 Pa | Substrate bias | −250 V |

Four specimens of magnetic recording media were produced in the manner as described above, with different concentrations, i.e., 0%, 1%, 2% and 4% of $N_2$ contained in gases introduced for forming respective second hard magnetic layers 42. Table 2 shows the result of observation with respect to magnetic characteristics of each of the magnetic recording media. In this table, "S" represents angle ratio.

TABLE 2

Gas Conditions for Forming Second Hard Magnetic Layer and Magnetic Characteristics of Respective Magnetic Recording Media

| | Mixed Gas Composition | Hc [A/m] | Brt [T$\mu$m] | S | S* |
| --- | --- | --- | --- | --- | --- |
| Comparative Example 1 | Ar + 0% $N_2$ | 228308 | $2.35 \times 10^{-2}$ | 0.86 | 0.75 |
| Example 1 | Ar + 1% $N_2$ | 242711 | $2.34 \times 10^{-2}$ | 0.88 | 0.90 |
| Example 2 | Ar + 2% $N_2$ | 205389 | $2.80 \times 10^{-2}$ | 0.93 | 0.94 |
| Reference Example 1 | Ar + 4% $N_2$ | 167272 | $2.38 \times 10^{-2}$ | 0.87 | 0.70 |

In Examples 1 and 2 and Reference Example 1, the second hard magnetic layer 42 was formed in an mixed atmosphere that is a mixture of Ar and $N_2$ gases. Examples 1 and 2 exhibited higher values of coercive force angle ratio (S*) as compared with the magnetic recording medium of Comparative Example 1 in which the second hard magnetic layer 42 was formed with only the Ar gas introduced. The highest coercive force angle ratio (S*), 0.93. was obtained in the case of Example 2 wherein a mixture of Ar and 2% $N_2$ gases were introduced. The coercive force, on the other hand, was kept at a value higher than $0.2 \times 10^6$ A/m in the case of Comparative Example 1 and Examples 1 and 2. Thus, when the second hard magnetic layer 42 was formed in an atmosphere in which Ar gas was mixed with 1% to 2% of $N_2$ gas, the resulting magnetic recording medium exhibited high values in both the coercive force (Hc) and the coercive force angle ratio (S*), assuring excellent electric characteristics.

According to the present invention, the coercive force angle ratio (S*) can be successfully improved without lowering the coercive force (Hc). Accordingly, the linear recording density can be increased due to the sufficiently high coercive force (Hc), and electromagnetic converting characteristics, such PW50, of the recording medium are improved due to the increase in the coercive force angle ratio (S*).

What is claimed is:

1. A method for manufacturing a magnetic recording medium, comprising the step of:

successively laminating a non-magnetic metal base layer, a ferromagnetic alloy thin-film magnetic layer and a protective layer on a non-magnetic substrate, said ferromagnetic alloy thin-film magnetic layer comprising a first magnetic layer and a second magnetic layer;

wherein said non-magnetic metal base layer and first magnetic layer are formed in a first atmosphere consisting essentially of an Ar gas, and said second magnetic layer is formed in a second atmosphere consisting essentially of a mixture of Ar and $N_2$ gases; and wherein said second atmosphere comprises Ar 1 to 2% of $N_2$ with respect to a total of said Ar and $N_2$ mixed gases.

* * * * *